United States Patent [19]

Tschirky et al.

[11] Patent Number: 4,562,853

[45] Date of Patent: Jan. 7, 1986

[54] DOWNHOLE FIRE CONTROL

[75] Inventors: John E. Tschirky, Long Beach, Calif.; Wayne M. Sullivan, Houston, Tex.

[73] Assignee: Smith International, Inc., Newport Beach, Calif.

[21] Appl. No.: 260,358

[22] Filed: May 4, 1981

Related U.S. Application Data

[62] Division of Ser. No. 124,588, Feb. 25, 1980, abandoned, which is a division of Ser. No. 838,890, Oct. 3, 1977, Pat. No. 4,213,508.

[51] Int. Cl.$^4$ ............................................. F16K 13/04
[52] U.S. Cl. ..................................... 137/75; 137/457; 166/325
[58] Field of Search ........................... 137/72, 75, 457; 166/317, 325; 175/17, 242

[56] References Cited

U.S. PATENT DOCUMENTS

| | | | |
|---|---|---|---|
| 2,903,005 | 9/1959 | Anderson | 137/75 |
| 3,151,688 | 10/1964 | Young | 137/75 X |
| 3,835,875 | 9/1974 | Morse | 137/75 |
| 3,921,657 | 11/1975 | Bergmark | 137/75 |
| 4,072,159 | 2/1978 | Kurosawa | 137/79 |

Primary Examiner—Harold W. Weakley
Attorney, Agent, or Firm—Price, Gess & Ubell

[57] ABSTRACT

A plurality of valve structures are incorporated in a drill pipe string for drilling a well into the earth utilizing air as the drilling fluid. A first valve is located in the drill pipe string just above the drilling bit, and an additional valve or valves are located in upwardly spaced relation within the drill collar string. Each of the valves has a valve member held in a position allowing the flow of air through the valve by a fusible support, and when the support melts, the valve member will shift to a position closing the valve. The valve just above the bit is combined with a float valve to prevent the upward flow of fluid into the drill string, while the valve or valves spaced upwardly in the drill collar string are full opening valves which allow the running of instruments through the drill string to selected locations above the bit. The additional upwardly spaced valve or valves include a flap held in a position to one side of the bore through the valve body by a fusible retainer. When the fusible retainer melts, releasing the flap, the flap seats on the sleeve to shut off the flow of fluid through the valve and through the drill pipe string and cause an increase in pressure of air above the closed valve.

1 Claim, 7 Drawing Figures

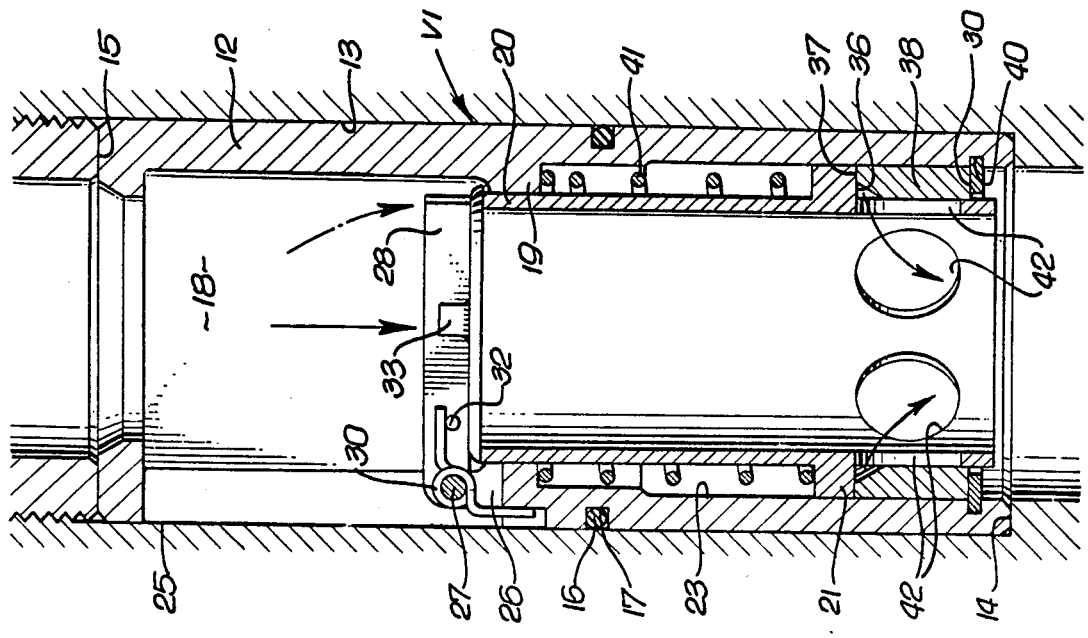
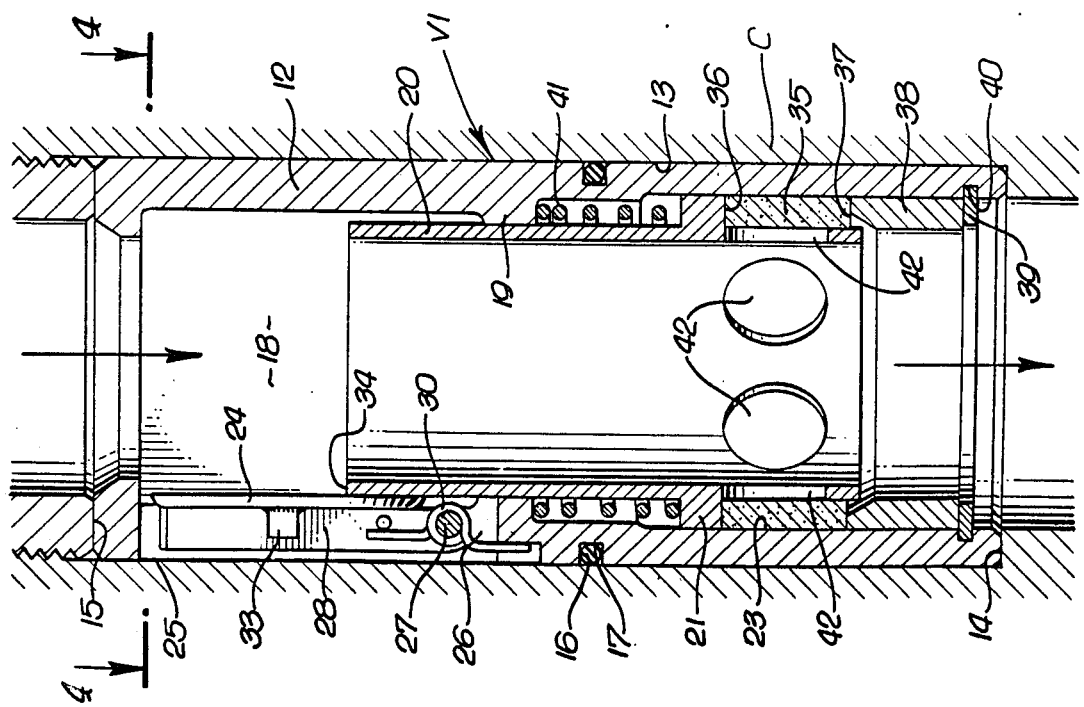

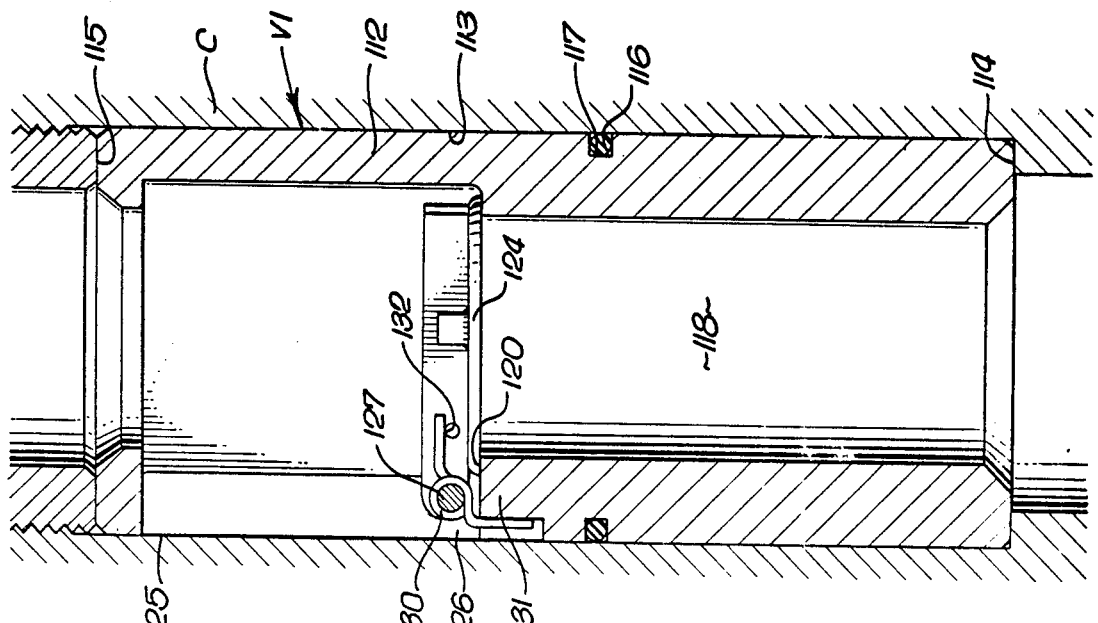

DOWNHOLE FIRE CONTROL

This application is a division of application Ser. No. 124,588 filed Feb. 25, 1980 now abandoned which is a division of Ser. No. 838,890 now U.S. Pat. No. 4,213,508 filed Oct. 30, 1977.

BACKGROUND OF THE INVENTION

In the drilling of wells into subterranean earth formation, air is sometimes used as the drilling fluid to flush cuttings from the bottom of the hole, as drilling progresses. If gas or oil is produced from the earth and mixes with the air in sufficient quantity to form a combustible mixture, a downhole fire can result.

In U.S. Pat. No. 3,845,784, granted Nov. 5, 1974, there is disclosed a so-called float valve which permits circulation of drilling fluid or air but automatically closes to prevent reverse flow, but such a float is useless to prevent the continued flow of air to the fire or to warn of the existence of a fire in the borehole.

In U.S. Pat. No. 3,537,518 granted Nov. 3, 1970, there is disclosed a "Safety Drill Pipe Float Valve With Heat Responsive Shutoff Sleeve" adapted to be installed in the drill pipe string above the bit, wherein a valve seat is formed as part of a member which is held in an initial position by a bond of solder or babbitt, which is heat sensitive so as to be liquified in the event of a borehole fire and allows the seating sleeve to engage a valve head and prevent the further flow of air through the drill string.

It may occur, however, that in the event of fire, damage may also be caused to the drill collars or drill string members spaced substantially upward in the hole from the bit, sometimes without leaving visible evidence. Therefore, following the downhole fire, it is possible that if each of the pipe members above the bit is not tested, a member or collar may fail during drilling of another well, resulting in additional problems and expenses.

SUMMARY OF THE INVENTION

The present invention provides heat responsive valve means in a well drilling pipe string which are operative at vertically spaced locations from just above the bit to, for example, the top of the drill collar string and selected intermediate locations between the bit and the top of the drill collar string, which valve means are operative to automatically close in the event of a fire either at the bottom of the hole or in some upwardly spaced location, to shut off the flow of air through the drill pipe string and to cause a rapid increase in the pressure at the compressor on the drilling rig floor, warning the driller that preventive action is necessary. The closure of the valves causes suffocation of the fire in the hole, and further preventive steps can be taken, such as the application of mist to the borehole to squelch the fire.

Since, during the course of the drilling operations, it is desired that various operations be performed on a wireline by the lowering of tools or instruments through the drill string to approximately just above the bit, such operations including, for example, the running of deviation detectors or survey instruments, a free-point locator device, or the like, the valves spaced upwardly above the bit in the drill collar string are full opening valves that offer no restriction to movement of such instruments downwardly through the drill pipe string. The valve means just above the bit includes valve of the so-called "float" type which can prevent the entry of fluid into the drill string through the bit, while allowing freedom of circulation, and the float valve means is combined with valve means according to the invention or including a valve which closes, in the event of fire close to the bit, to shut off the further circulation of drilling fluid.

The full opening valve in accordance with the invention has a tubular body with an axial flow passage. A flap valve is pivoted at one side of the body and held in an open position by a fusible material. When the fusible material melts, the flap valve is biased to engagement with a seat.

This invention possesses many other advantages, and has other purposes which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense.

BRIEF DESCRIPTION OF THE DRAWINGS

FIG. 2 is an enlarged fragmentary longitudinal section on the line 2—2 of FIG. 1, showing one form of the valve in its normal, open condition;

FIG. 3 is a view corresponding with FIG. 2, but showing the valve closed;

FIG. 6 is a view corresponding with FIG. 2, but showing another form of full opening valve in the open position; and FIG. 7 is a view corresponding with FIG. 6, but showing the valve closed.

DESCRIPTION OF THE PREFERRED EMBODIMENT

Figure 1:
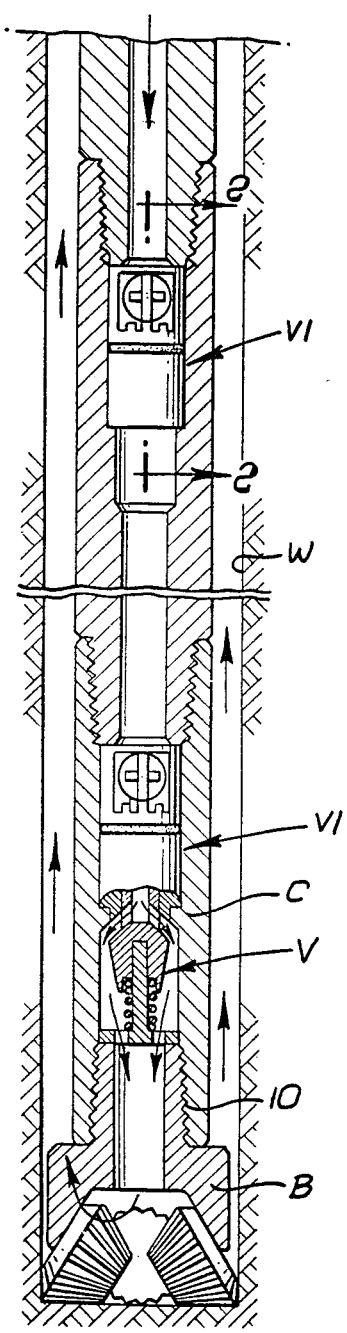
FIG. 1 is a partial longitudinal section and partial elevation showing a drill string for drilling a well and containing valve structures in accordance with the invention.
Figure 4:
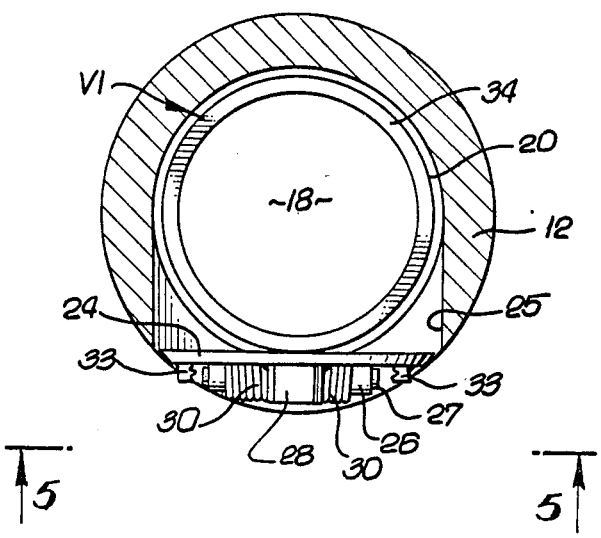
FIG. 4 is a transverse section on the line 4—4 of FIG. 2.

Referring to FIG. 1, a first valve V, which may be that specifically disclosed in the above-identified U.S. Pat. No. 3,845,784, to which reference is hereby made for the purpose of illustration of the valve V, is installed in a drill pipe string just above a bit B adapted to drill a wellbore W through the earth formation, as air circulates downwardly through the drill pipe string the valve V and the bit, and then upwardly through the wellbore annulus between the drill pipe string and the well wall. Above the bit B is a heavy so-called drill collar connected by a threaded joint 10 to the bit and extending upwardly therefrom. Above the valve V, close to the bit, is a valve structure V1, having the capacity to automatically close as later described, in the event of a fire adjacent the bottom of the hole, near the bit. If desired, the valve means V may be a safety float according to the disclosure of the above-identified U.S. Pat. No. 3,537,518, in which case the first valve V1 may be located at the top of the lower drill collar or at a higher selected location in the drill string. At least one additional valve structure V1 is installed in the drill string, say at the top of the lower-most drill collar C, and in the event additional drill collars are incorporated in the string, additional valves V1 may be installed in vertically spaced relation to the lower-most valve V. All of the valves V, V1, are normally opened during the circulation of air, as shown by the arrows in FIG. 1, and each of the valves V1 is constructed to automatically close in the event that the heat of the drill collar in the hole increases to a given value, indicative of the existence of a fire in the well bore, either at the bottom thereof or at any of the several vertically spaced locations of the valves V1. In addition, as will be more particularly described hereinbelow, the upwardly spaced valves V1 are of the full opening type affording no restriction to the passage through the drill string of various wireline instruments as is customary for making certain surveys or locating a free point in the event that the pipe becomes stuck, or the like.

In the event that a fire occurs within the well bore, due to the mixing of air with flammable gas produced from the subsurface formation, it is desired that the driller controlling the drilling operation at the earth's surface become aware of the existence of the fire and that the circulation of air be terminated, so as to not further feed air to the fire and so that remedial operations can be commenced. The valves V1 of the invention are adapted to permit the circulation of air unless a fusible element melts allowing the valve to instantaneously close and create a large pressure increase in the air within the drill stem passage 11 and at the compressor at the surface which supplies such air. Such rapid pressure increase indicates to the driller that the compressor should be shut down. Thereupon, the lower-most valve V above the bit will not permit reverse flow from the wellbore through the bit and into the drill string, as more particularly disclosed in the aforementioned prior patents.

Referring to FIGS. 2 through 5, the valve assembly V1 is shown as comprising an elongated tubular body 12 adapted to be received in an enlarged bore 13 within one of the drill collars C and to abut at the lower end of the body with an upwardly facing shoulder 14, the upper end of the body being engaged by the lower end 15 of the threaded pin of the length of drill pipe or drill collar above. To prevent the flow of air around the outside of the body, the body carries an elastomer seal ring 16 disposed in a companion groove 17 in the outer periphery of the body and sealingly engaged within the drill collar bore 13.

Within the valve body 13 and extending longitudinally therethrough is a flow passage 18, through which, when the valve is open, as seen in FIG. 2, drilling fluid or air can pass downwardly for circulation from the drill string and upwardly through the well bore annulus, as previously indicated.

Figure 5:
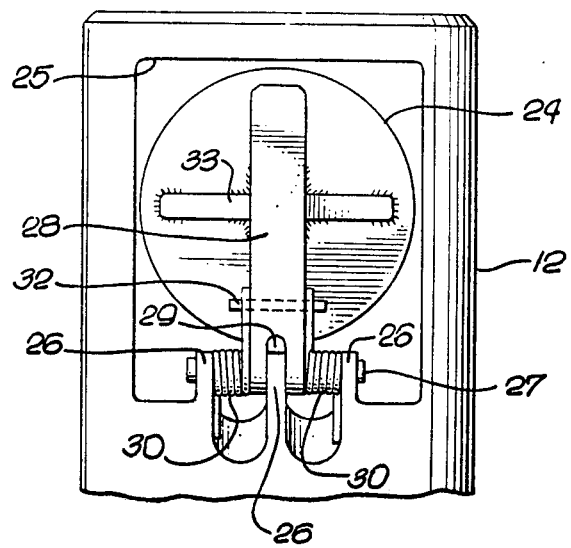
FIG. 5 is a fragmentary side elevation as viewed on the line 5—5 of FIG. 4.

Centrally of the body 12 is a guide flange 19 of reduced diameter which slidably receives the outside diameter of an elongated valve member or sleeve 20, the sleeve 20 having intermediate its ends an outwardly projecting flange or guide 21 slidably engaged within an enlarged diameter bore 23 within the valve body 12. The sleeve 20 cooperates with the companion valve member 24 which is in the form of a flap valve adapted to be held by the upper end of the sleeve 20 in a laterally open or displaced position within a side window or pocket 25 formed in the valve body. Within the window, the valve body has, as best seen in FIG. 5, a support structure for the flap valve including a number of laterally spaced ears 26 supporting a hinge pin 27 which extends therethrough and through a support bar 28 of the flap valve 24. The support bar 28 is notched at 29 to receive the center ear 26 of the support structure, and spring means in the form of a pair of torsion springs 30 are disposed about the pivot pin 27 and have respective ends engaged with the valve body at 31 and with an anchor pin 32 carried by the flap support bar 28. The flap valve 24 is of circular form and preferably has another support bar 33 on its outer face and at right angles to the support bar 28 so that the circular flap is rendered rigid.

As seen in FIG. 3, when the valve sleeve 20 is in a lower position, the springs can bias the flap 24 about its pivot pin 27 to the closed position, at which the flap engages the upper transverse seating surface 34 on the sleeve 20, so that the flow of fluid through the valve sleeve from the flow passage 18 is prevented.

The sleeve 20 is adapted to be held in its upper position, with the flap valve 24 in its open position by fusible means 35 interposed between the sleeve and the body of the valve assembly and responsive to excessive heat to allow the valve sleeve 20 to shift downwardly from the position of FIG. 2 to the position of FIG. 3, thereby allowing the flap valve 24 to close and seat on the upper end of the sleeve 20.

The fusible means 35 is in the form of a ring and constitutes an abutment disposed between a downwardly facing abutment shoulder 36 beneath the guide flange 21 of the sleeve 20 and an upwardly facing shoulder 37 of a body ring 38 which is in turn held in the body by a suitable retainer ring 39 engaged in a groove 40 formed within the lower end of the valve body. Between the sleeve guide flange 21 and sleeve guiding flange 19 on the body is a coiled compression spring 41 which normally acts to bias the sleeve 20 downwardly, in the absence of the fusible material 35 between the sleeve shoulder 36 and the body shoulder 37.

It will be noted that for assembly purposes the valve structure is assembled by progressively installing the valve spring through the lower end of the housing or body, then inserting the sleeve 20 and the fusible abutment member 35. Finally, the lower ring 38 is installed within the body and retained in place by the snap ring 39.

Means are provided for affording space for the flow of the molten fusible material when the latter is subjected to excessive heat. In the illustrative embodiment, the lower end of the sleeve 20 has a suitable number of radial ports 42, the top of which coincides with the undersurface 36 of the sleeve guide flange 21, whereby, as the fusible material 35 melts, it is enabled to flow from the annular space defined between the body and the sleeve and between the opposing shoulders, through the ports 42 and into the flow passage through the valve assembly. The important thing here is that the molten fusible material not interfere with the downward movement of the sleeve to the extent necessary to release the flap valve 24 and allow its pivotal movement into engagement with the upper end of the sleeve.

Referring to FIGS. 6 and 7, the valve assembly V1 is illustrated in a more simple form. In this form, the valve V1 comprises an elongated tubular body 112 adapted to be disposed in an enlarged bore 113 within the drill collar C and to abut at the lower end of the body with an upwardly facing shoulder 114 in the drill collar, the upper end of the valve body being engaged by the lower shoulder or end 115 of the threaded pin of the length of drill pipe or drill collar above. Here again, to prevent the flow of air around the outside of the valve body, the body 112 carries an elastomer seal ring 116 disposed in a companion groove 117 in the outer periphery of the body and sealingly engaged within the drill collar bore 113 extending longitudinally through the valve body is a flow passage 118 of substantially the same diameter as the flow passage through the drill collar C, through which, when the valve is open, as seen in FIG. 6, drilling fluid or air can pass downwardly for circulation from the drill string and upwardly through the well bore annulus, as previously indicated. Within the valve body 112 is a circumferentially continuous upwardly facing shoulder or valve seat 120 adapted to be engaged by the flap valve 124 which is held in the open position by a body of fusible material 124a which is suitably provided in the side window 125 in which the valve flap 124 is disposed, the valve flap 124 being embedded in or encapsulated in the fusible material so as to be held in the open position. The valve body has, as in the case of the previous embodiment, a support structure for the flap valve including the laterally spaced ears 126, like those shown in FIG. 5, supporting the hinge pin 127, about which the torsion spring means 130 are disposed and engaged with the valve body at 131 and with the valve flap at 132. The flap valve 124 is of circular form and has reinforcing bars on its outer periphery, as in the case of the previously described flap.

In order to embed the valve flap 124 in the body of fusible material 124a, a mandrel (not shown) may be inserted into the fluid passage 118 of the valve body, the mandrel being of cylindrical form so as to force the valve flap 124 to the open position and back into the pocket 125, by engagement of the upper edge of the valve flap with the sidewall of the mandrel. Thereafter, with a suitable form closing the outer portion of the window 125, molten fusible material such as zinc or babbitt may be poured into the window 125 to fill the entire window space, and encapsulate the flap valve, as well as the valve closing spring. When the zinc or babbitt material has solidified the outer form may be removed and the internal mandrel removed from the valve body bore, and the flap valve 124 will be retained in the open position, as seen in FIG. 6, until such time as the fusible material 124a is subjected to such heat as to cause it to melt. In the event that the fusible material 124a is melted, the flap valve 124 wll be allowed to move from the open position of FIG. 6 to the closed position of FIG. 7, in engagement with the upwardly facing valve seat 120, about the entire periphery of the valve flap. Such closure of the valve flap 124 against its seat will instantaneously preclude further flow of air downwardly through the drill collar string and cause a pressure increase at the surface or at the compressor sypplying the drilling air, warning the driller of the closure of one or the other of the vertically spaced valves V1, so that remedial operations can be commenced, such as the injection of mist into the annular space. Furthermore, the valve V, whether of the simple float type or of the heat responsive safety float type, will prevent the return flow of air and gas into the drill string.

From the foregoing it will be apparent that the invention provides a valve, one or more of which can be installed in the well drilling pipe string at vertically spaced locations, so as to detect heat at a given elevation in the presence of a fire in the well bore. One or more of the valves subjected to the heat of the fire will be allowed to close, causing an instantaneous large increase in the pressure in the drill string above the closed valve, indicative to the driller that the compressor should be shut down to terminate the flow of air to the well bore thereby depriving the fire of air.

We claim:

1. A valve structure comprising: an elongated tubular body adapted to be installed in the bore of a drill pipe string, said body having an axial passage therethrough substantially as large as said bore, a flap valve member pivotally mounted at one side of said body for movement between a position transverse of said passage and a position pivoted to said side of said body, fusible means holding said flap valve in said position at said side of said body, and means providing a transverse seat surrounding said passage and engaged by said flap valve upon melting of said fusible means, said body having a side pocket receiving said flap valve when said flap valve is pivoted to said side of said body, said fusible material having said flap valve embedded therein and filling said pocket.

* * * * *